United States Patent Office 3,409,666
Patented Nov. 5, 1968

3,409,666
HYDROLYSIS OF AMINONITRILES
Robert W. Foreman, Chagrin Falls, Ohio, assignor to The Standard Oil Company, Cleveland, Ohio, a corporation of Ohio
No Drawing. Filed Jan. 24, 1966, Ser. No. 522,379
5 Claims. (Cl. 260—534)

This invention relates to a rapid process for converting aminonitriles to the corresponding amino acids and salts thereof and more particularly pertains to a rapid process for substantially complete hydrolysis of aminoacetonitriles in an alkaline medium to the corresponding aminoacetic acids and salts thereof.

The aminoacetonitriles useful in the present process include nitrilotriacetonitrile, ethylene diamine tetraacetonitrile, diethylene triamine pentaacetonitrile, methylamine diacetonitrile, ethyl amine diacetonitrile and the like, all of which are readily prepared by known methods, such as those disclosed in U.S. Patents Nos. 2,205,995 and 2,855,428. Most preferred as starting materials in the process of this invention are nitrilotriacetonitrile having the structure $N(CH_2CN)_3$ and ethylene diamine tetraacetonitrile having the structure $$(NCCH_2)_2NCH_2CH_2N(CH_2CN)_2$$

and most preferred is nitrilotriacetonitrile.

The instant process comprises partially hydrolyzing a mixture of water and substantially equivalent amounts of an aminonitrile and an alkali metal hydroxide at a temperature of from 50 to 120° C. for at least ten minutes and then spray drying the mixture at a temperature of from 200 to 900° F. to produce an amino acid salt product of from 99.5 to 100% purity.

The stoichiometry for the preferred reaction is indicated by the following chemical equation:

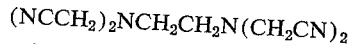
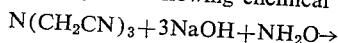

The final product of the process of this invention is a colorless, solid salt of the aminoacetic acid which, in some instances, may be isolated as a hydrate. For instance, in the hydrolysis of nitrilotriacetonitrile in aqueous sodium hydroxide by the process of this invention, the product is a colorless solid sodium nitrilotriacetic acid monohydrate. The product subsequently may be converted to the acid by known neutralization means such as strong acid, ion exchange, etc.

The instant process provides a rapid and substantially complete hydrolysis of nitrilotriacetonitrile to nitrilotriacetic acid salt by preliminary partial hydrolysis of at least part of the nitrilotriacetonitrile in aqueous caustic followed by the spray drying of the partially hydrolyzed mixture to produce the dry, substantially completely hydrolyzed product. In this process, essentially quantitative yields of the monohydrate of the trisodium salt of nitrilotriacetic acid are produced in a very short reaction time. The product is pure, white, odorless, and uniform in particle size with a cyanide level of less than 3 parts per million and a sodium carbonate level of no more than 0.5%. The product assays at 99.5 to 100% trisodium salt monohydrate of nitrilotriacetic acid by cupric chloride titration. Preferably, the product produced by the instant process assays at 100% plus or minus 0.3%.

The time required for the entire instant process can be as short as about 10 minutes from the time the nitrilotriacetonitrile is fed into the system until the final product is produced. Ordinarily, the initial stage of the hydrolysis reaction takes place very rapidly when the nitrilotriacetonitrile is added incrementally to stoichiometric amounts of aqueous sodium hydroxide. This rapid reaction is maintained until the conversion level reaches about 70% of theory. The later stages of the hydrolysis are exceedingly slow and usually incomplete by normal procedure because of the diminishing ratio of caustic to nitrilotriacetonitrile. By spray drying of the partially hydrolyzed aqueous solution, complete hydrolysis can be obtained in a matter of minutes. This result is indeed unobvious and unexpected.

For optimum results in the process of this invention, it is important for the feed material to be free of any contaminants such as hydrogen cyanide. To accomplish this, the nitrilotriacetonitrile may be recrystallized from water prior to hydrolysis. The nitrilotriacetonitrile is then partially hydrolyzed to about the 60–85% level with stoichiometric or equivalent amounts of sodium hydroxide in aqueous solution. An equivalent amount of sodium hydroxide is that amount theoretically required to hydrolyze and neutralize each of the nitrile groups present in the particular aminonitrile employed as starting material. The use of less than equivalent amounts of caustic is to be avoided because hydrolysis is incomplete and amides and other by-products are formed. When an excess amount of caustic is employed, caustic remains in the product and a complex process is required for its removal. Although other alkali metal hydroxides, such as potassium hydroxide, lithium hydroxide and cesium hydroxide can be used, sodium hydroxide is preferred in this process.

Although nitrilotriacetonitrile is sparingly soluble in caustic, solutions, slurries, or combinations of both, can be employed in this process. The solids content of the hydrolyzate can be close to 50% while still remaining in solution. Concentrations greater than 50% usually produce slurries rather than solutions. The solids content of the hydrolyzate feed also affects the size of the spray drying unit that is required in the operation or the amount of product produced in a spray drying unit. Generally, a stoichiometric or equivalent excess of water based on the nitrile content of the aminonitrile is used, for instance, from about 5 to 75 moles of water per mole of nitrilotriacetonitrile preferably are employed.

The initial hydrolysis step is carried out at temperatures in the range of 50 to 120° C. Temperatures above 100° C. can be maintained in a pressurized system. At lower temperatures, the hydrolysis reaction is too slow. The use of the instant two-step process decreases the time required for the complete hydrolysis reaction to as little as about 10 minutes.

The ammonia formed in the reaction is removed by conventional means such as inert gas and/or air stripping or by thin film reduced pressure stripping. It is desirable to remove as much of the ammonia as possible from the pre-hydrolyzed product, since ammonia contamination can cause some yellow coloration in the final product. Stripping rates of from 10 to 500 volumes of gas/volume of liquid/hour may be used.

To insure that a pure white final product results, it is sometimes desirable to add a small amount, approximately 0.5–3%, of a bleaching agent such as hydrogen peroxide in the form of 30% aqueous hydrogen peroxide to the pre-hydrolyzed mixture before spray drying.

The spray drying step in the process can be carried out in conventional spray drying equipment. The principal unobvious and unexpected advantage of spray drying is that the very slow and ordinarily incomplete final hydrolysis reaction by usual procedures can be carried substantially to completion in a matter of seconds in the spray drying operation.

The usual spray drying equipment has a drying chamber, a source of hot gases, a means of atomizing the liquid feed and a method for separating the dry product from the exhaust gases. The equipment may be operated with countercurrent or concurrent gas-flow and may be heated by oil, gas or coal-fired furnaces. The spray drying preferably is done at a temperature from about 200 to 900° F. The inlet gas temperatures to the spray dryer may vary over a wide range but, in general, temperatures of from about 300° F. to about 900° F. are preferred. The outlet gas temperature from the spray dryer preferably will fall within the range of 200 to 350° F. Atomization may be accomplished by any one of several conventional atomizing devices, for example, high pressure nozzles, two fluid nozzles and high speed rotating discs. The particle size of the final product is not critical and it will depend upon the degree of atomization of the liquid slurry but this can be varied over a wide range in accordance with techniques well known in the art.

In general, the liquid solution or slurry of ingredients is pumped into the atomizing device which in the case of a countercurrent spray dryer is located near the top of the spray drying chamber. Hot gas is admitted at the bottom of the chamber and flows upward countercurrent to the descending globules of solid slurry to an exit at the top of the spray dryer. The product from the spray dryer may be collected either continuously or intermittently as the size of the batch to be prepared and other considerations may dictate.

Experiments illustrating the feasibility of the hydrolysis process described and claimed herein and the yields and purities of the products that can be obtained are shown in the following examples. A specific process employed nitrilotriacetonitrile (NTN) as starting material and aqueous sodium hydroxide as hydrolysis medium. Example I illustrates the process of the instant invention. Examples II–V illustrate processes which are outside the scope of the present invention.

EXAMPLE I

Experiments A and B shown in Table I each employed a reaction mixture of sodium hydroxide/NTN/water in the mole ratio of 3/1/26.9, respectively. Also in each of these experiments 0.026 gram per gram of NTN of 30% aqueous hydrogen peroxide was added to the mixture before spray drying, nitrogen stripping was employed during hydrolysis and 50 p.s.i.g. pressure was exerted on the spray dryer turbine. The NTN was twice recrystallized from water prior to use in these experiments.

EXAMPLE III

In Table III the reaction mixture was composed of 3 moles of sodium hydroxide per mole of nitrilotriacetonitrile (NTN) and the mole ratio of water to NTN was 46:1. All of the reactants were placed in the reactor at once at about 150 mm. pressure. The spray drying rate was 15 cc. per minute and a small amount of 30% aqueous hydrogen peroxide was added before spray drying to decolorize the trisodium salt of nitrilotriacetic acid.

This example, which is outside the scope of the present invention, demonstrates that the initial hydrolysis temperature was too low and as a result, the final product was of too low purity to be of commercial value.

TABLE III

| | | |
|---|---|---|
| Hydrolysis conditions: | | |
| Temperature | °C | 40 |
| Time (after NTN all added) | days | 2 |
| Weight 30% H₂O₂/wt. NTA | | 0.012 |
| Spray drying conditions: | | |
| Inlet air temperature | °F | 714 |
| Outlet air temperature | do | 206 |
| Cyclone air temperature | do | 178 |
| Turbine air pressure | p.s.i.g | 30 |
| Analysis and results: | | |
| Appearance | | White powder |
| Percent NTA recovery | | ¹ 78 |

¹ Assayed by infrared analysis 82% NTA.

EXAMPLE IV

The procedure of Example I was repeated except that the initial slurry was prepared by adding 50% aqueous sodium hydroxide to a mixture of NTN and ice in a Waring blender and the mixture was kept at ice bath temperature. The slurry was composed of 3 moles of sodium hydroxide, one mole of NTN and 33.5 moles of water. The slurry was then spray-dried at a feed rate of 25 cc. per minute using an inlet temperature of 509° F., an outlet temperature of 250° F. and a cyclone air temperature of 214° F. The product was yellow, smelled strongly of ammonia and assayed by CuCl₂ assay only 10.3% trisodium salt of nitrilotriacetic acid.

EXAMPLE V

A repeat of Example II where the reaction mixture B was given a further heat treatment at about 300° F. under

TABLE I

| Ex. | Mode of NTN add'n. | Temp. (°C.) | Time, Min. | Feed Rate, cc./min. | Inlet Air Temp., °F. | Outlet Air Temp., °F. | Cyclone Air Temp., °F. | Dried Product Color | Percent NTA Recovered Determined by Weight | Percent NTA by CuCl₂ Assay |
|---|---|---|---|---|---|---|---|---|---|---|
| A | 2/5 at 40 min | 80–88 | 45 | 17 | 438 | 308 | 268 | Pure white | 100 bulk dens.=0.31 | 99.88 |
| B | 2/5 at 40 min | 80–88 | 34 | 17 | 438 | 308 | 268 | do | 100.2 bulk dens=0.30 | 100 0 |

EXAMPLE II

In Table II the mole ratio of sodium hydroxide to nitrilotriacetonitrile was 3:1 in experiments A and B. This example is outside the scope of this invention and illustrates that mere hydrolysis without the spray drying step is insufficient to produce an acceptable product.

autogenous pressure for a fed minutes produced a dark colored product which assayed only 92% trisodium salt of nitrilotriacetic acid.

EXAMPLE VI

Results comparable to those in the preceding examples were obtained when ethylene diamine tetra-acetonitrile

TABLE II

| | Hydrolysis Conditions | | | | | Product Evaluation | |
|---|---|---|---|---|---|---|---|
| Ex. | Mol Ratio H₂O/NTN | Mode, Time Plus Temperature of NTN Addition | Hydrolysis Temp., °C. | Hydrolysis Time (Hours) | Percent NH₃ Collected | Wt. 30% H₂O₂/ Wt. NTA | Color | Percent Conversion to NTA (CuCl₂ Titration Assay) |
| A | ¹ 6.1 | Solid NTN gradually throughout run, under vacuum. | 85 | 5.7 | 84.7 | .026 | Very light yellow solution. | 92.3 |
| B | ² 35.4 22.4 | Plus H₂O added during and after reaction. Add ⅙ portions of solid NTN every ½ hour. | 85 | 3 | 81 | .013 | Clear yellow solution. | 91.9 |

¹ Initial. ² Final.

was used as starting material in place of nitrilotriacetonitrile.

I claim:
1. The process for producing an aminoacid salt comprising partially hydrolyzing a mixture of water and substantially equivalent amounts of an aminonitrile selected from the group consisting of nitrilotriacetonitrile, ethylene diamine tetraacetonitrile, diethylene triamine pentaacetonitrile, methylamine diacetonitrile, and ethyl amine diacetonitrile and an alkali metal hydroxide at a temperature of from about 50 to 120° C. and then spray drying the mixture at a temperature of from 200 to 900° F.
2. The process of claim 1 wherein the partial hydrolysis time is at least about one minute.
3. The process of claim 2 wherein the alkali metal hydroxide is sodium hydroxide.
4. The process of claim 3 wherein the aminonitrile is nitrilotriacetonitrile.
5. The process of claim 3 wherein the aminonitrile is ethylene diamine tetraacetonitrile.

References Cited

UNITED STATES PATENTS

| 2,855,438 | 10/1958 | Singer | 260—534 |
| 3,183,262 | 5/1965 | Singer et al. | 260—534 |

LORRAINE A. WEINBERGER, *Primary Examiner.*

A. P. HALLUIN, *Assistant Examiner.*